(12) United States Patent
Tehrani

(10) Patent No.: US 6,438,288 B1
(45) Date of Patent: Aug. 20, 2002

(54) TUNABLE OPTICAL FILTER SYSTEM

(75) Inventor: Mohammad M. Tehrani, Westlake Village, CA (US)

(73) Assignee: Lightap, Camarillo, CA (US)

( * ) Notice: Subject to any disclaimer, the term of this patent is extended or adjusted under 35 U.S.C. 154(b) by 0 days.

(21) Appl. No.: 09/738,593

(22) Filed: Dec. 15, 2000

(51) Int. Cl.$^7$ ................................................ G02B 6/26
(52) U.S. Cl. ............................. 385/27; 385/15; 385/33
(58) Field of Search ............................ 385/15, 24, 27, 385/33, 34

(56) References Cited

U.S. PATENT DOCUMENTS

| 4,400,058 A | 8/1983 | Durand et al. |
|---|---|---|
| 4,553,816 A | 11/1985 | Durand et al. |
| 4,609,822 A | 9/1986 | Roche |
| 5,062,684 A | 11/1991 | Clayton et al. |
| 5,073,004 A | 12/1991 | Clayton et al. |
| 5,289,552 A | 2/1994 | Miller et al. |
| 5,375,181 A | 12/1994 | Miller et al. |
| 5,430,574 A | 7/1995 | Tehrani |
| 5,506,920 A | * 4/1996 | Suemura et al. ............... 385/25 |
| 5,781,332 A | * 7/1998 | Ogata .......................... 359/308 |
| 6,040,944 A | 3/2000 | Pan et al. |
| 6,111,997 A | * 8/2000 | Jeong .......................... 385/27 |
| 6,157,025 A | * 12/2000 | Katagiri et al. ............. 250/226 |

\* cited by examiner

*Primary Examiner*—Akm E. Ullah
*Assistant Examiner*—Jennifer Doan
(74) *Attorney, Agent, or Firm*—Price and Gess

(57) ABSTRACT

A tunable optical filter system receives an optical signal, from an optical fiber. A predetermined wavelength is to be selected from the optical signal. The filter has a first and second aligned collimating lens, each lens having a mirrored surface separated by a gap. The first collimating lens collimates the light beam and outputs a collimated output beam via the its mirrored output surface to the opposing mirrored surface. A diaphragm coupled to a frame has a pair of piezo elements position the diaphragm to adjust the gap to select a predetermined wavelength signal from the collimated beam. A coupler samples a portion of the beam for a servo that responds to an input signal that identifies the wavelength to be selected. The servo provides a pathlength control signal to the piezo elements to coarse select the predetermined wavelength signal from the collimated output beam.

22 Claims, 7 Drawing Sheets

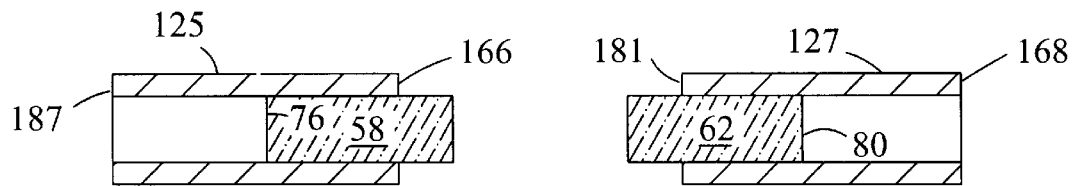
FIG. 7a
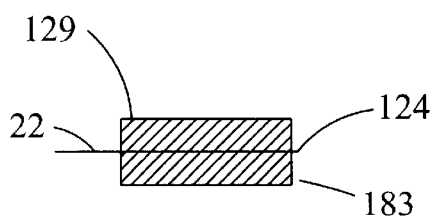
FIG. 7b
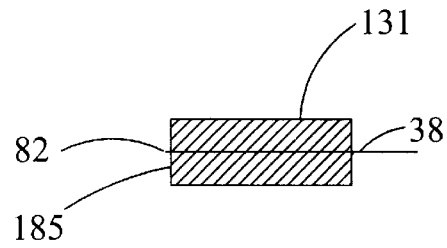
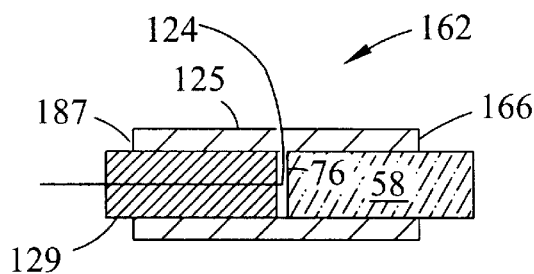
FIG. 7c
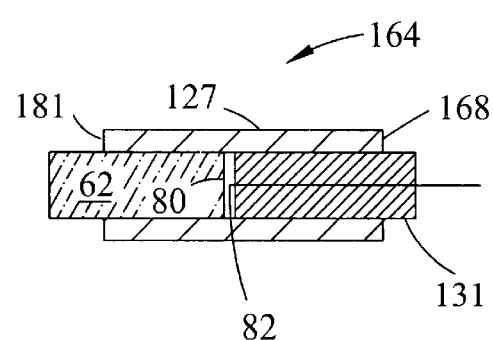

TUNABLE OPTICAL FILTER SYSTEM

BACKGROUND OF THE INVENTION

This invention describes a new method of constructing a tunable Fabry-Perot interferometer which results in a rugged, highly stable, low optical loss, self temperature compensating and dynamically re-configurable tunable filter for a number of applications including fiber optic communication systems.

The tunable optical filter system consists of an optical module having a one or two-piece cylindrical housing. A thin flexible diaphragm using the same material as the housing is either an integral part of one of the housing's two segments, as shown in FIG. 2 or bonded to the housing as shown in FIG. 6. Two piezoelectric rings are co-axially attached to the faces of the diaphragm. The two piezo elements, when properly connected electrically, form a bimorph. Under an applied voltage or pathlength control signal, the bimorph flexes the diaphragm and causes an axial motion to any object attached to it.

Input and output fibers are each co-axially attached to one side of a collimating lens. Each lens collimates the beam passing through it as the beam exits the lens. The lens can be made an integral part of the fiber by appropriately shaping the end or the lens can be a separate element to which the fiber is attached using conventional techniques such as epoxy bonding or laser fusion. If a separate lens is used, the preferred approach is to deposit anti-reflection coating on the two contacting surfaces to reduce the filter's optical losses and back reflections. Graded index (GRIN) lenses are particularly useful for this purpose. As is well known, a GRIN lens with a ¼ pitch at the desired wavelength converts the diverging output of an attached fiber to a parallel beam. The fibers can be single-mode fibers generally used in modern fiber optic networks. The other sides of the two collimating pigtailed lenses, when coated for high reflectivity, form the two reflecting surfaces of the Fabry-Perot interferometer, as shown in FIG. 2.

The two lenses have flat mirror surfaces that partially transmit light passing through them. The reflecting surfaces are placed parallel to each other within the optical module. The lenses are positioned by attaching one lens to one segment of the housing and passing its pigtailed fiber through an axial hole in the housing. The other lens is similarly attached to the diaphragm. Such a parallel plate interferometer constitutes a band-pass filter. The distance between the mirror surfaces can be adjusted to pass a particular wavelength and reject others. An electrical voltage applied to piezos flexes the diaphragm which causes the attached lens to move axially thereby tuning the filter to select a particular wavelength. Initial tuning can also be accomplished by manually adjusting a set screw, threaded cap or threaded plug that is in contact with the diaphragm. Another function of the set screw is to adjust the gap between the two reflecting surfaces to a predetermined value during the assembly to account for the dimensional tolerances of the housing and the lenses. The cap or plug has a hole or aperture through it to allow the output fiber to exit the housing or to allow the input fiber to enter the housing.

The tunable filter system also has a coupler. The output fiber is connected to a coupler which uses a small portion of the output power to activate the servo loop for locking the filter's bandpass to the desired channel. A method to accomplish this is to apply a small amplitude dither voltage to the piezos. If the filter's bandpass is not centered at the selected channel wavelength, the detector output will be different in the two halves of the dither cycle. The difference is integrated by the electronics and a DC signal is generated which drives the piezo and adjusts the cavity length to pass the desired channel. A separate DC signal can also be superimposed to initially move the bandpass to any desired channel. This latter signal can be programmed and remotely controlled for dynamic reconfiguration of the filter's bandpass.

Tunable filters are sensitive to temperature changes. An important feature of the present invention is its self-compensating of errors caused by temperature variations.

SUMMARY OF THE INVENTION

In a first embodiment, we have a tunable optical filter system comprising; an optical module having, a tunable optical cavity. The optical module responds to a pathlength control signal to select and output a predetermined wavelength signal selected from a optical signal having at least two wavelengths. A servo controller responds to an input signal that adjusts the pathlength control signal to select the predetermined wavelength signal. The servo controller also responds to a sample portion of the predetermined wavelength signal to finely adjust the pathlength control signal to maximize the optical power in the sample portion predetermined wavelength signal. The tunable optical filter system has an optical module that has a frame, and a first and a second axially aligned collimating lens. Each collimating lens has a mirrored surface normal to the optical axis and separated by a gap distance to form a cavity.

The first collimating lens has an input surface coupled to receive the optical signal having at least two wavelengths. The lens collimates the light beam and outputs the collimated beam into the cavity. A diaphragm is coupled to the frame. The diaphragm has at least a first piezo element mechanically attached to the diaphragm to warp the diaphragm in response to the pathlength control signal. The second collimating lens is mechanically coupled to the diaphragm and is axially positioned by the diaphragm to adjust the gap distance to select a predetermined wavelength signal from the collimated beam and to output the predetermined wavelength signal from an output surface.

In another more particular embodiment, the optical module has a frame. An input fiber carries a optical signal from a light source. The optical signal has at least a first and a second wavelength from which a predetermined wavelength is to be selected. The light beam is coupled to a first and a second axially aligned collimating lens. Each collimating lens has a mirrored surface normal to the optical axis. The mirrored surfaces are separated by a gap distance to form a resonant cavity. The input fiber couples the light beam into the first collimating lens. The first collimating lens collimates the light beam and outputs the collimated output beam via the its mirrored output surface into the gap.

In yet another embodiment the optical module has a first cylindrical cup with a rim around an aperture at a first end and a thin base forming a first diaphragm at the second end. The first diaphragm has an inner surface at the interior base of the cup and an outer surface. The first diaphragm has a small centered aperture. A second cylindrical cup has a rim around an aperture at a first end and a base with a threaded aperture at the other end. A cylindrical plug has a threaded portion for insertion in and engagement with the second cylindrical base threaded aperture. The cylindrical plug has a centered aperture. A second diaphragm has a first face and a second face. The second diaphragm is rigidly positioned between the first cylindrical cup rim and the second cylindrical cup rim with the first face facing into the first cylindrical cup aperture. The second diaphragm has a center aperture.

An input fiber passes through the cylindrical plug center aperture and through the second diaphragm center aperture carrying the optical signal from a light source. The optical signal has at least a first and a second wavelength from which a predetermined wavelength is to be selected. The first collimating lens input surface is coupled to the second diaphragm first face. The input fiber has an output end coupled to the first collimating lens input surface to couple the light beam into the first collimating lens. The second collimating lens output surface is coupled to the first diaphragm inner surface. A means for coupling the plug to the second diaphragm second surface is included. The plug is rotated to advance and axially position the first collimating lens mirror surface to a predetermined gap distance from the second collimating lens mirror surface. The tunable optical filter system also has a coupler with an input port coupled via the first diaphragm aperture to the first collimating lens output surface to receive the predetermined wavelength portion of the collimated output beam and to provide a sample portion of the predetermined wavelength signal via its sample output port. A servo controller responds to a wavelength select signal characterized to identify the predetermined wavelength to be selected and provides a coarse pathlength control signal to the piezo elements to adjust the gap distance to coarse select the predetermined wavelength signal. The servo controller also responds to the sample portion of the predetermined wavelength portion of the collimated output beam to adjust the pathlength control signal to the piezo elements to maximize the optical power of the predetermined wavelength portion of the collimated output beam.

BRIEF DESCRIPTION OF THE DRAWINGS

FIGS. 7a, 7b and 7c is a schematic sequence showing most of the method steps used in making a pair of collimator subassemblies.

DETAILED DESCRIPTION OF THE INVENTION

Figure 1:
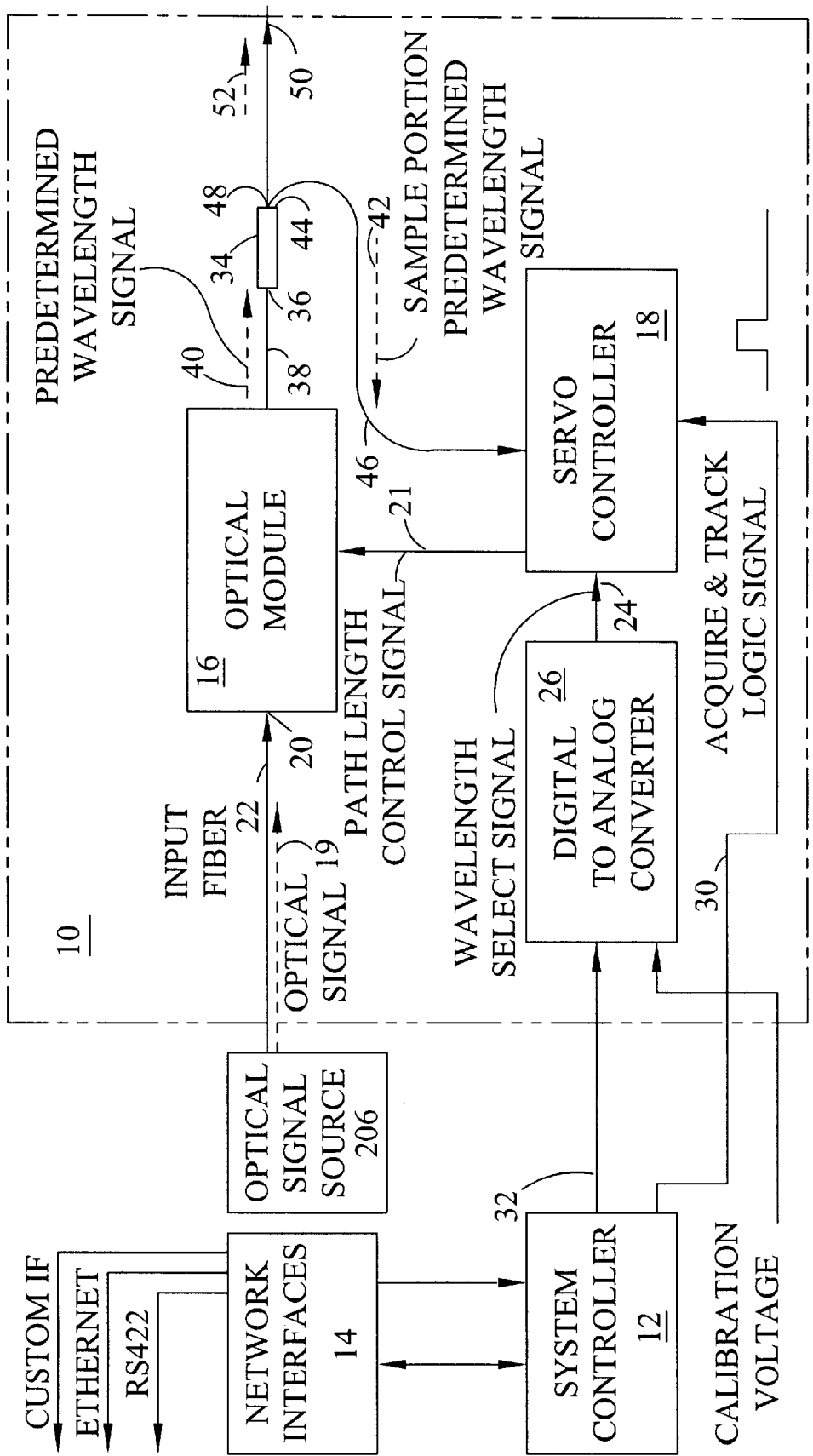
FIG. 1 is a block diagram of the Tunable Optical Filter System.

Referring now to the drawings, FIG. 1 shows a block diagram of the tunable optical filter system within phantom block 10 driven by or receiving control commands from a system controller 12 which receives information from a number of network interfaces 14. The network interfaces are coupled to a number of data sources such as an Etherenet connection and an RS422 connection.

An optical module 16 within phantom box 10 is an electrically tunable Fabry-Perot cavity fabricated so as to be substantially insensitive to temperature changes. A servo controller 18 provides a pathlength control signal via signal path 21 to the optical module 16 to drive a pair of piezo transducers that adjust the pathlength or gap distance between opposed mirror surfaces forming the tunable cavity within the optical module 16. The optical module 16 receives a optical signal 19, at input port 20 via input fiber 22. The optical signal has at least two predetermined wavelengths from which a single wavelength is to be selected under the command of a wavelength select signal via signal line 24 from a DAC (digital to analog converter) 26. The servo controller 18 also receives an acquire and track logic signal via signal line 30 from the system controller 12. The acquire and track logic signal is transmitted concurrently with a digital wavelength select signal via digital bus 32 to the DAC 26.

The tunable optical filter system 10 has a coupler 34 with an input port 36 coupled via output fiber 38 to receive a predetermined wavelength signal represented by ray 40. The coupler splits the signal power to deliver a small sample portion of the predetermined wavelength signal represented by ray 42 from its sample port 44 via optical fiber 46 to the servo controller 18. The remainder of the predetermined wavelength signal is output from the coupler output port 48 on fiber 50 as the output predetermined wavelength signal represented by ray 52.

Figure 2:
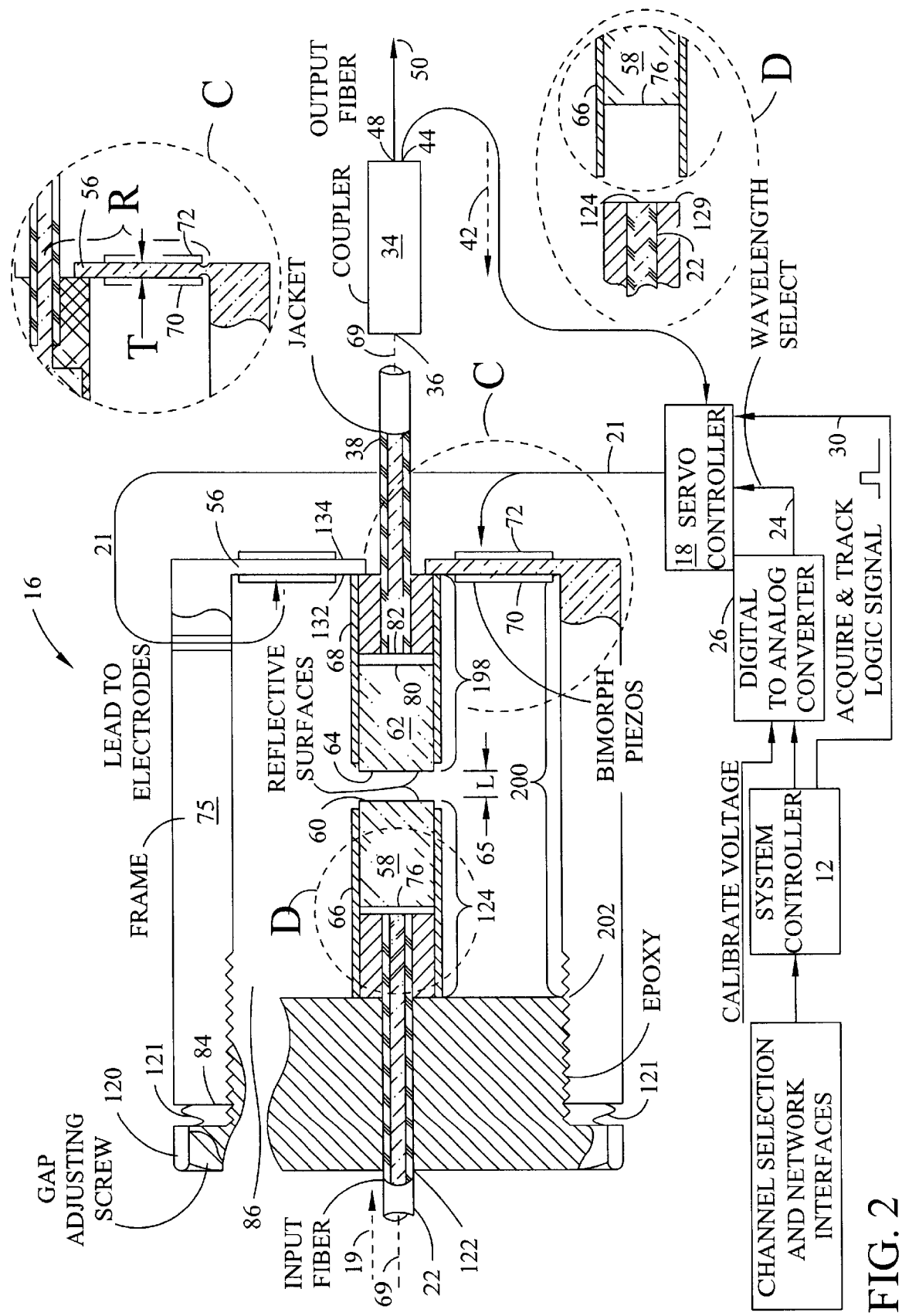
FIG. 2 is schematic partial section of a first embodiment of the Optical Module, using a single diaphragm.

FIG. 2 is a schematic partial section characterization of a first embodiment of the Optical Module 16 using a single diaphragm 56 a lower portion of which is shown enlarged insert drawing "C". The thickness of the diaphragm 56 is indicated by the dimension "T" and its radius is depicted with the dimension "R". The surface of the diaphragm is shown under cut or thinned at its outer radius to improve flexibility. An inner piezo 70 and outer piezo transducer are shown bonded to the diaphragm's inner and outer surface.

The Optical Module 16 embodiment of FIG. 2 is a preferred embodiment because it uses a single diaphragm 56. A first collimating lens 58 has a first mirror surface 60 and a second collimating lens 62 had a second mirror surface 64. The gap 65 is the distance between the mirrors.

Before the sleeves 66, 68 are assembled into the optical module, the first and second collimating lenses 58, 62 are mounted in each respective sleeves 66, 68. Fibers 22 and 38 are inserted into ferrules 129, 131 after which the fibers are end-stripped, and bonded into the respective ferrule, and polished to achieve an optically flat surface. After polishing, the output end 124 of fiber 22 and the input end 82 of output fiber 38 is coated with an anti-reflective material. The ferrules are then inserted and bonded into a respective sleeve 66, 68.

The position of each ferrule in a sleeve is adjusted while light is passed through the fiber to a detector or beam profiler. The position of the ferrule in the sleeve is adjusted with respect to the lens input surface 76, 80 until light from the lens under test shows that collimation is maximized which after allowing the adhesive to cure form a subassembly which we will refer to as a collimator. The sleeves 66, 68 and are then assembled in the optical module 16 and co-axially aligned on optical axis 69.

The first and second mirror surfaces 60, 64 are partially transparent and positioned in opposed relation forming a tunable optical cavity having gap 65, essentially a Fabry-Perot resonator. The optical module 16 responds to a pathlength control signal on signal path 21 from the servo controller 18. The optical module 16 selects and outputs a predetermined wavelength signal, as shown in FIG. 1 as ray 40, via the second mirror 64, the second collimating lens 62, the second collimating lens output face 80, the output fiber input end 82, the output fiber 38, the coupler input port 36 to the coupler 34. The predetermined wavelength signal 40 is selected from a optical signal 19 having at least two predetermined wavelengths. The coupler 34 in Figure has an input port 36 coupled to receive the predetermined wavelength signal 40, a sample port 44 for providing a sample predetermined wavelength signal 42, and an output port 50 for providing an output predetermined wavelength signal represented by ray 52.

The servo controller 18 responds to the wavelength select signal on signal line 24 from the DAC 26 to adjust the pathlength control signal on signal path 21 to the inner and outer piezo transducers, shown as BIMORPH PIEZOS 70, 72 bonded to the diaphragm 56 and driven by the pathlength control signal on path 21 to warp the diaphragm 56 to select the predetermined wavelength signal 40 from the optical signal 19. The servo controller 18 is also shown receiving a sample portion of the output predetermined wavelength signal 42 with which it finely adjusts the pathlength control signal on signal path 21 to maximize the optical power of the sample portion of the selected predetermined wavelength signal 40.

Figure 3:
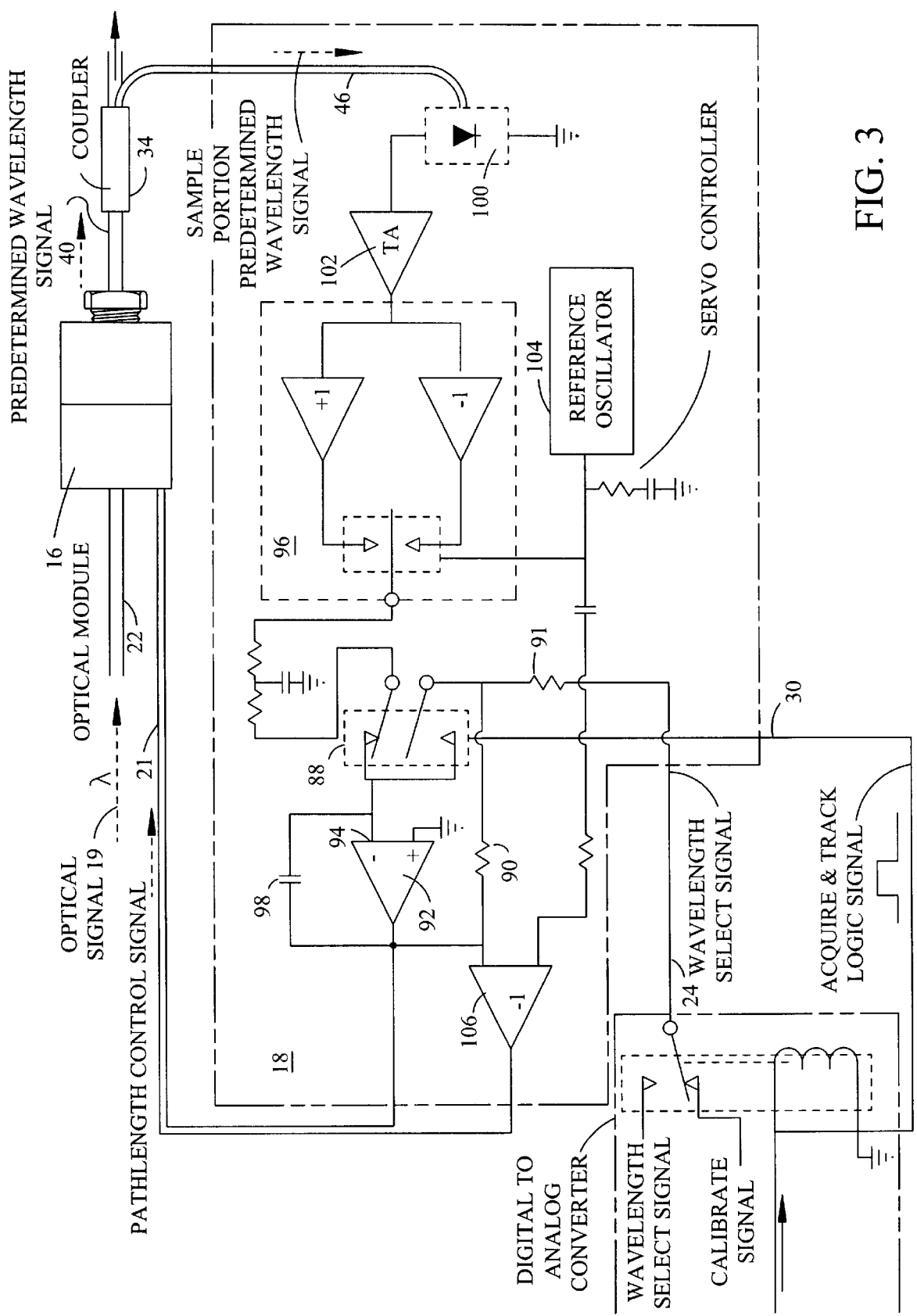
FIG. 3 is a simplified schematic of the Servo Controller.
Figure 6:
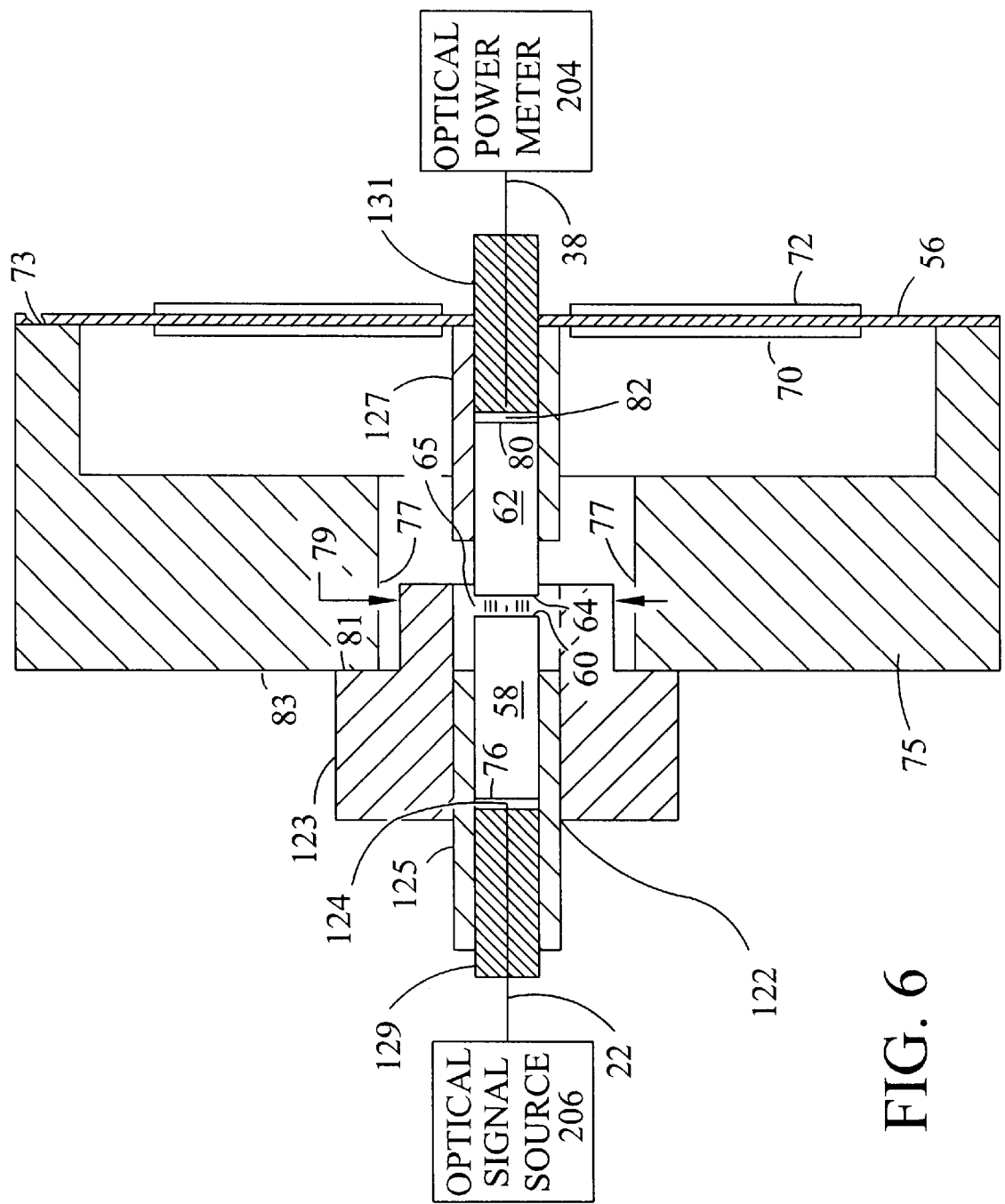
FIG. 6 is schematic partial section of a preferred alternative structure for the Optical Module of FIG. 2 the, using a single diaphragm.

FIG. 2 shows a frame or cylindrical housing 75. The first collimating lens 58 has an input surface 76 coupled to receive the optical signal 19. The first collimating lens 58 collimates the light beam and outputs the collimated beam into the cavity between the first and second mirror surfaces 60, 64. The diaphragm 56 is shown to be coupled to the frame 75 as an integral and homogenous portion of the base of the cylindrical housing or frame 75. The diaphragm can be a separate part or assembly bonded to or secured to the base of the cylindrical housing as shown in FIG. 6 or in the alternative, the cylindrical housing can be made with a thin flexible base 56 as shown. As depicted the diaphragm 56 has a first piezo element 70 bonded to the inner surface 132 of the base of the cylindrical housing and a second piezo bonded to the outer surface of the base of the cylindrical housing or cup. The piezos are mechanically attached to the diaphragm to warp the diaphragm translating the second collimating lens 62 axially on the optical axis 69 to adjust the gap between the first and second mirror surfaces 60, 64 in response to the pathlength control signal on signal path 21. The second collimating lens 62, within the sleeve 68 is mechanically coupled to the diaphragm 56 inner surface and axially positioned by the diaphragm to adjust the gap distance. The gap distance is adjusted as required to select a predetermined wavelength signal from the collimated beam and to output the predetermined wavelength signal 40 from an the second lens output surface 80. Output fiber 38 has an input end 82 coupled to the second collimated lens output surface 80 to receive and carry the predetermined wavelength signal 40 from the second collimated lens output surface 80 to the input port of coupler 34. In the embodiment of FIG. 3, the output fiber 38 passes through an aperture in the diaphragm. The output fiber 38 has an output end terminating at the input port 36 of coupler 34.

The DAC (digital-to-analog converter) 26 of FIG. 2 receives a digital input data word characterizing the magnitude and polarity of the pathlength control signal that is necessary to cause the bimorph piezos to warp the diaphragm to adjust the gap distance to a value corresponding to a resonance peak for a predetermined wavelength selection signal on signal line 24. The DAC converts the digital data word or digital input into an analog output signal, the wavelength select signal on signal line 24. Calibration of the tunable optical filter is achieved by inserting a light beam with known wavelengths. An external adjustable calibration source of voltage is substituted for the wavelength select signal on signal line 24. The coupler output port 50 is monitored and the calibration voltage is adjusted until the output predetermined wavelength signal is detected and its power maximized at the output port 50. The value of the calibration source voltage is adjusted through a range and the values recorded for each respective predetermined wavelength identified. The recorded values are used to form a lookup table.

Given any channel for which a DAC output voltage is known, the DAC can be commanded to provide a wavelength select signal that exactly corresponds in voltage to the voltage recorded in the lookup table that was known to tune the cavity to the correct gap. In an alternative embodiment, the DAC is further characterized to be responsive to a calibrating logic signal having a first and second state. The first state logic signal substitutes an externally derived calibrate voltage or signal for the wavelength select signal input to the servo controller.

The optical module of FIG. 2, in a preferred embodiment, has a cylindrical housing 75 formed as a cup. The housing has a rim 84, the inner circumference of which forms a contiguous boundary around an aperture 86 at a first end. The diaphragm 56 is at the second end of the cylinder. The inner piezo 70 and an outer piezo 72 are electrically coupled to the pathlength control signal on signal path 21 so as to expand and contract in opposing relationship along radial axis extending outward from the optical axis passing through the cylinder so as to warp or deflect the diaphragm longitudinally along the optical axis. As the diaphragm moves in response to a changing pathlength control signal, the second collimating lens is translated in a first axial direction in response to a pathlength control signal having a first polarity or in an opposite axial direction in response to a pathlength control signal having a second polarity. The diaphragm could be formed with a pre-load so as to achieve reciprocal motion over a range using a signal of a single polarity varying within a range. The diaphragm could be formed to have a circular thinned recess near the root support or near the thicker cylindrical wall so as to enhance its flexibility.

FIG. 3 is a schematic of a preferred embodiment of the servo controller. The servo controller circuit is an adaptive circuit that responds to an acquire and track logic signal first state by configuring itself to function in a first mode, and to a logic signal second state by configuring itself to function in a second mode. As the acquire and track logic signal assumes a first state, the analog switch 88 transfers downward connecting feedback resistor 90 from the output of amplifier 92 to its inverting input 94. Resistor 91 is an input resistor to inverting input 94.

The ratio of the values of input resistor 91 to feedback resistor 90 is one. Amplifier 92 therefore functions as an inverting unity gain amplifier. The feedback capacitor 98 converts the amplifier to a low pass filter. The capacitor 98 is charged to the value of the output of amplifier 92 since the inverting input is maintained at a virtual ground. The input resistor 91 is driven by the wavelength select signal which provides an analog value, determined by calibration, to drive the gap distance to a value that will resonate on or very near the peak of the predetermined wavelength signal of interest. The output from the synchronous rectifier is disconnected by operation of the top analog switch to the down position. Therefore, the circuit configures itself to operate open loop to tune or slew the cavity to the wavelength commanded but does not close the loop for fine tuning while the acquire and track logic signal is present.

As the acquire and track logic signal assumes a second state, the analog switch 88 transfers upward disconnecting the feedback resistor 90 from the inverting input of amplifier 92. Although the feedback resistor remains connected between the wavelength select signal and the output of amplifier 92, it no longer functions in the circuit. The output of amplifier is a hard source and its voltage is not influenced by current passing through feedback resistor 90. However, as the analog switch 88 contacts transfer to the upper position in response to an acquire and track signal assuming a second state, the combination of amplifier 92 and capacitor 98 form an integrator. The output of the synchronous amplifier 96 is coupled to the input of the integrator.

The detector 100 in combination with transconductance amplifier 102 provide a signal proportional to the power of the sampled predetermined wavelength signal on optical fiber 46 from coupler 34. Synchronous rectifier 96 chops the detected signal in response to reference oscillator 104, typically a 555 timer. The synchronously rectified signal is integrated by the integrator. The output of the integrator (amplifier 92) is fed to a first piezo in the optical module 16 and also to the input of inverting unity gain amplifier 106. Amplifier 106 inverts the output of amplifier 92. The output of the unity gain amplifier 106 drives the second piezo transducer with an inverted equivalent of the output of amplifier 92. The piezos are therefore driven in a push-pull fashion.

The output of the reference oscillator 104 is supplied to another input to the inverting amplifier 106 which input is added to its output to dither the pathlength control signal. The dither of the pathlength control signal in combination with the synchronous rectification by the analog switch or synchronous rectifier 96 followed by integration of the chopped and synchronously detected signal produces a slope chasing or lock-in amplifier function that adjusts the bi-phase drive to the piezos to fine tune the cavity to peak the power of the signal detected.

It can be seen that once activated into the second mode, the circuit no longer refers to the wavelength select signal until the acquire and track command again changes state to the first state for a new coarse tune command. The circuit will remain locked onto the lobe or wavelength that it was delivered to while the acquire and track command was in the first state.

Figure 4:
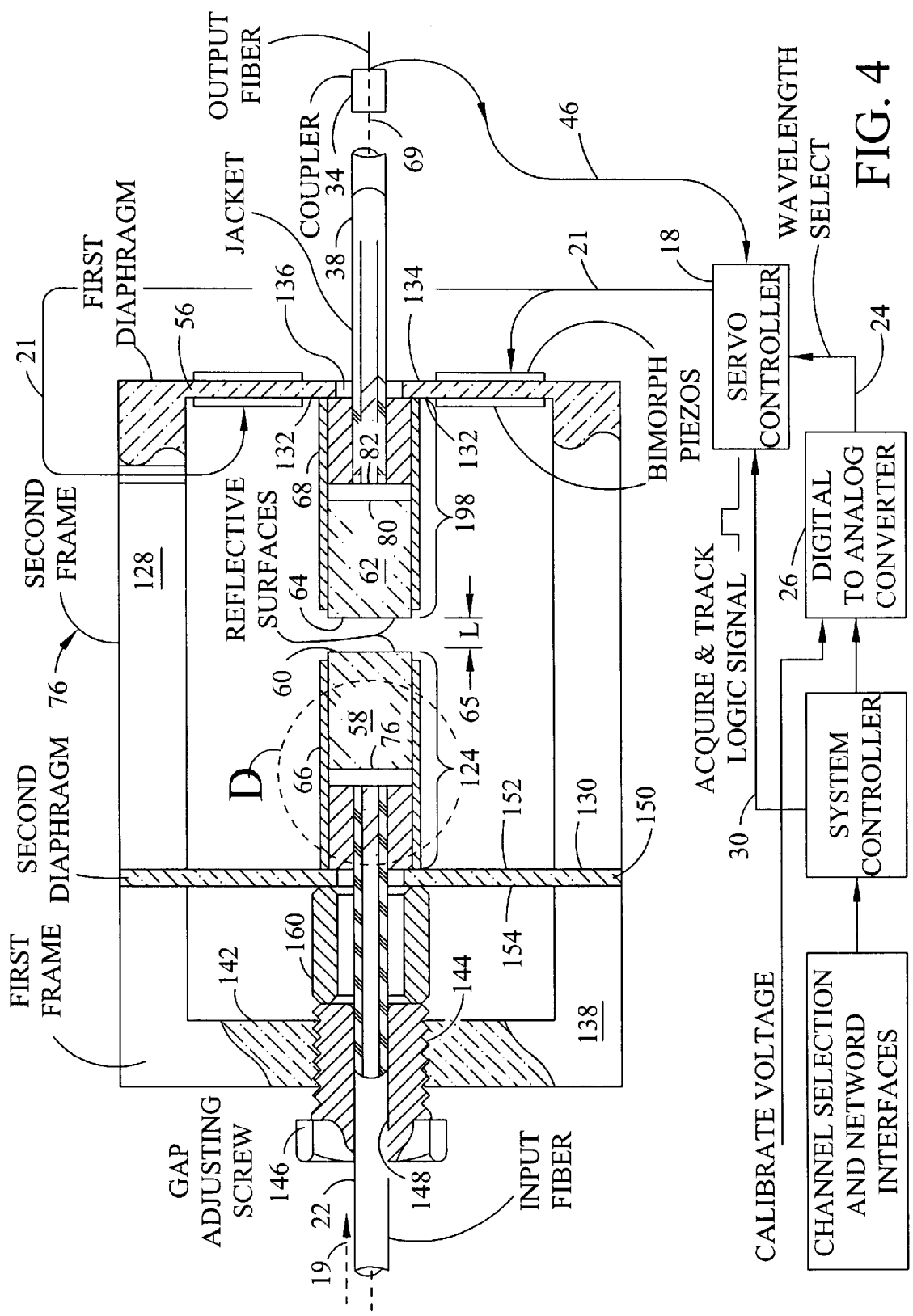
FIG. 4 is schematic partial section of a second embodiment of the Optical Module using two diaphragms.
Figure 5:
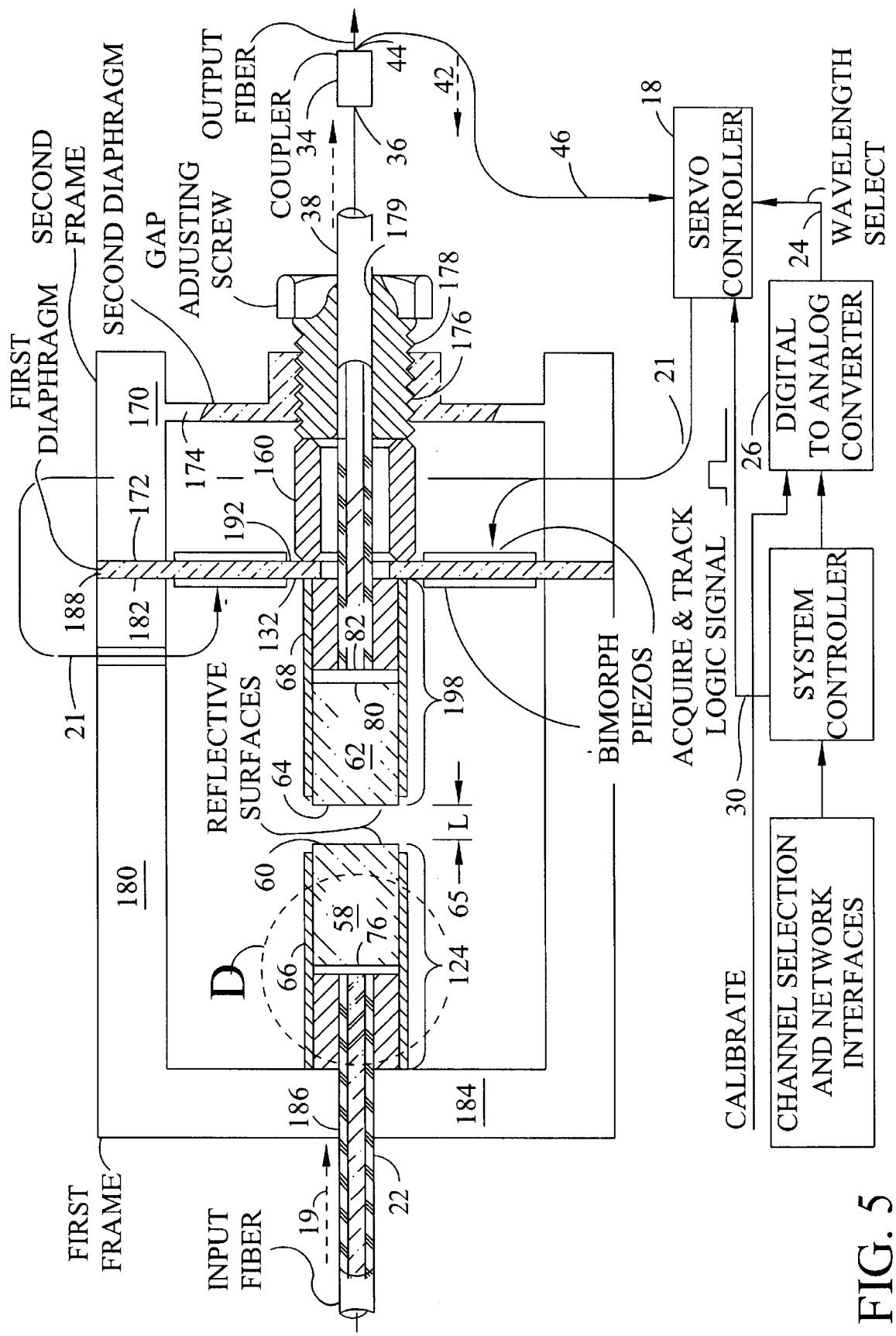
FIG. 5 is schematic partial section of a second embodiment of the Optical Module using two diaphragms.

In each of the embodiments of the optical modules of FIGS. 2, 4 and 5, the first collimating lens and the second collimating lens are each contained in respective sleeves to permit accurate registration and to ease fabrication. The sleeves are formed from material having a temperature coefficient that is substantially the same as that of the lens material used for the first and second collimating lenses 58, 62.

In the embodiment of FIG. 2, the frame 75 is sealed by a cap or threaded plug or adjusting screw 120. The cap has a center hole or aperture 122. A spring or O-ring 121 operates as an anti-lash device in stabilizing the plug 120 which is rotated for the initial gap distance adjustment. The input fiber 22 passes through the cap aperture 122. The input fiber has an output end 124 that is coupled to the first collimating lens input surface 76 to couple the light beam into the first collimating lens. The FIG. 2 insert drawing "D" shows the input fiber extracted from the ferule 66 to more clearly show its output end 124 and to more clearly show the first collimating lens input surface 76.

In each of the respective embodiments, the input fiber 22 carries the optical signal 19 from optical signal source 206 and has an output end 124 coated with a non-reflective coating to prevent light reflecting off of the input face of the first collimating lens back into the source. In each of the embodiments of FIGS. 2, 4, 5 and 6, the input fiber output end 124 is coupled to the first collimating lens input surface 76 and couples the light beam into the first collimating lens 58.

FIG. 4 shows a second embodiment in which the frame or cylindrical housing has a first cylindrical cup 128 with having a rim 130 around an aperture at a first end and a thin base forming a first diaphragm 56 at the other end. The first diaphragm 56 has an inner surface 132 at the interior base of the cup 128 and an outer surface 134 and a small centered hole 136 of sufficient diameter to pass output fiber 38. A second cylindrical cup 138 has a rim 140 around a hole at a first end. The hole penetrates the second cylindrical cup along a optical axis to a depth to form a base 142. The base is of sufficient thickness to provide a central threaded hole or a threaded aperture 144.

A cylindrical plug 146 has a threaded portion that is shown inserted and engaged in the second cylindrical base threaded aperture 144. The cylindrical plug has a centered hole or centered aperture 148 of sufficient diameter to pass input fiber 22. A second diaphragm 150 has a first face 152 and a second face 154. The second diaphragm 150 is rigidly positioned between the first cylindrical cup rim 134 and the second cylindrical cup rim 140 with the first face 154 facing into the first cylindrical cup aperture. The second diaphragm 150 has a center aperture 158. An input fiber 22 passes through the cylindrical plug center aperture 148 and through the second diaphragm center aperture 158 carrying the optical signal 19 from a light source that is not shown through the gap adjusting screw 146 and standoff 160 to the first collimating lens input surface 76. The first collimating lens input surface 76 is more clearly shown in insert drawing "D" of FIG. 2. The optical signal 19 has at least a first and a second wavelength from which a predetermined wavelength is to be selected.

The first collimating lens input surface 76 is coupled to the second diaphragm first face 152 via sleeve 66. The input fiber 22 has an output end 124, more clearly shown in the insert D drawing of FIG. 2, coupled to the first collimating lens input surface 76 to couple the optical signal into the first collimating lens 58. A second collimating lens 62 has an output surface 80 coupled to the first diaphragm inner surface 132.

In the embodiments of FIGS. 4 and 5, hollow sleeve or standoff 160 represents a means for coupling the plug 146 to the second diaphragm second surface 154. The plug 146 is rotated to axially position the first collimating lens mirror surface to a predetermined gap distance from the second collimating lens mirror surface 64.

FIGS. 4 and 5 shows that the tunable filter system embodiments each have a coupler 34 with an input port 36. The embodiment of FIG. 4 shows the input port 36 coupled via the first diaphragm aperture 134 to the first collimating lens output surface 80 via output fiber 80. The servo controller 18 of FIGS. 4 and 5 are equivalent in function and structure as the servo controller 18 described in connection with the preferred embodiment of FIGS. 2 and 3.

FIG. 5 shows a third embodiment of the tunable optical filter system 10. The frame is formed from a first and second cylindrical cup or housing 170, 180. The first cylindrical cup has a rim 172 around an aperture at a first end and an integral base 174. The base 174 has a central boss or thickened portion that has a threaded aperture 176. A cylindrical plug 178 is threaded for insertion in and threaded engagement with the first cylindrical cup threaded aperture 176. The threaded cylindrical plug 178 has an aperture 179 for passage of the output fiber 38. A second cylindrical cup 180 has a rim 182 around an aperture at a first end and a base 184 with an aperture 186 at a second end. A first diaphragm 188 has a first and second surface 190, 192 respectively. The first diaphragm has a centered aperture 194. The first diaphragm 188 is rigidly held between the first cylindrical cup rim 172 and the second cylindrical cup rim 182. The first diaphragm, first surface 190 faces into the second cylindrical cup. A first collimating lens 58 has an input face 76 coupled to the second cup base 184. An input fiber 22 has an output end 124 coupled to the first collimating lens input surface 76 via the second cup base aperture 186 and sleeve 66 to couple the optical signal 19 into the first collimating lens 58.

A second collimating lens 62 has an output surface 80 coupled to the first diaphragm first face 190. Output fiber 38 has an input end 82 coupled to the second collimating lens output face 80 to receive the selected predetermined wavelength. The integral base 174 of the second cup 170 forms a second diaphragm 174. The output fiber 38 carries the selected predetermined wavelength via the first diaphragm aperture 194 to the cylindrical plug central aperture 179. Hollow sleeve or standoff 160 represents a means for coupling the plug 178 to the first diaphragm second surface 192. The plug 178 is rotated to axially position the second collimating lens mirror surface 64 to a predetermined gap distance from the first collimating lens mirror surface 60.

Referring to FIGS. 2, 4 and 5, the function of the gap adjusting screw 120 in the embodiment of FIG. 2, 146 in the embodiment of FIG. 4 and 148 in the embodiment of FIG. 5 in combination with the servo controller's response output of a pathlength control signal to the first and second piezo transducers via signal path 21 to a wave length select signal having a predetermined amplitude and the arrival of an acquire and track logic signal first state provide a means for initially adjusting the length of the cavity 65 to one half of an integer number of first predetermined wavelengths. Calibration of the optical module using the gap adjusting screw (120, 146 or 178) and a calibrate voltage into the DAC in substitution for the wavelength select signal to maximize the power of a wavelength that is centrally positioned in a band of predetermined wavelengths is a means for initially adjusting the gap distance of the cavity to one half of an integer number of first predetermined wavelengths, and for biasing the initial calibration such that the first predetermined wavelengths is selected to be the predetermined wavelength that is centrally positioned in the spectrum of all predetermined wavelengths. In each of the embodiments of FIGS. 2, 4 and 5, a gap adjusting screw or threaded plug 120, 146, 178 functions as a means for adjusting the gap distance of the cavity to be one half of an integer number of first predetermined wavelengths. They each represent at least a first threaded member coupled to the frame. Except for the embodiment of FIGS. 2 and 6, each alternative embodiment is shown with a gap adjusting screw 146 in contact with the 56. A sleeve 160 is used to complete the contact in the embodiments of FIGS. 4 and 5. The threaded member is rotated, in each case, to initially adjust the position of a diaphragm to an initial position characterized to maximize the power of the output signal for the first predetermined wavelength.

The combined function of the initial adjustment gap adjusting screw 120, the servo controller's response when calibrated, the coupler's sampling function and operation of the servo controller in response to the acquire and track signal first state to maximize the power of in the sample portion of a predetermined wavelength is an example of a means for initially adjusting the length of the cavity 65 to one half of an integer number of first predetermined wavelengths. Operation of the same group of elements and functions in combination and in response to an acquire and track logic signal second state is an example of a means for adjusting the gap to a distance L characterized by the following equation:

$$L = \frac{m\lambda}{2}$$

where m is an integer and $\lambda$ is the center wavelength of the light passing through the tunable optical filter.

Referring again to FIG. 2, bracket distance 200 represents the first portion of the frame wherein the frame 75 first portion extends from the first diaphragm 56 to a first point of support 202 at the inner face of gap adjusting screw 120. The first and second collimating lenses are coaxially positioned between the diaphragm and the first point of support. The length of the first collimating lens and sleeve 66, bracket 196, plus the length of the second collimating lens and sleeve 68, bracket 198, plus the gap 65, shown as distance L is substantially equal to the length of the frame first portion defined by bracket 200. The first and second collimating lenses and the sleeves they are contained in are formed from a first material, such as glass or glass in combination with ceramic for the sleeve, in the case of the lenses, having a first coefficient thermal expansion. The frame first portion, bracket 200, is formed from a second material having a second coefficient of thermal expansion. In the preferred embodiment, the first and second materials are selected to have thermal coefficients of expansion that are substantially equal. When the materials are selected in this manner, the expansion of the frame first portion is equivalent to the expansion for the pair of lenses. However, the expansions are in opposite directions, so they cancel. The result is improved thermal stability.

With the components that are believed to be available, it is believed that an optical module can be made that will reliably select one predetermined wavelength or channel from a spectrum containing one hundred wavelengths or channels. The voltage required to select a predetermined wavelength would be stored in a look-up table or calculated from an algorithm. If a uniform scale factor is assumed, or determined to exist as a result of testing, it may be possible to select a channel j from i channels by selecting a voltage equal to i-j volts from a ramp that extends from zero to i units in amplitude. The servo controller would then drive the piezos with the calculated voltage.

If a uniform scale factor is assumed the maximum change in the gap is expected to be in the range of 1.0 to 2.0 microns for one hundred channels. The small movement in the gap required supports the presumption that the change in voltage required for a given change in wavelength will be linear.

In addition to use of an applied ramp, the system can be augmented to sample the amplified output of the detector, and count the peaks that arise as channels are passed, from a starting point. It may be possible to use the count of peaks to anticipate or confirm the arrival at the right peak. By counting i-j number of peaks, the system can be programmed to know that it has reached the correct channel or wavelength. At that point, the servo controller circuit changes its mode, and becomes a lock-in amplifier or slope chasing servo. The slope chasing servo then adjusts the gap to obtain a peaked output at the commanded wavelength.

At present, the voltage range on the piezos is a design discretion but might be as high as 240 volts. The design will limit the voltage rise on the slewing voltage to the PZT so as not to approach the poling limit for the PZT. The object is to avoid de-poling the PZT. The PZT has a reverse voltage that is impressed on its crystal structure at the time of manufacture to POLE the component. Exceeding the design limit of the component will result in de-poling the components.

The embodiments of FIGS. 2, 4 and 5 show the use of a threaded plug or screw or cap having a central aperture or hole, adapted to and receiving therein a collimator. In practice, the use of a threaded component may be found to be unnecessary for some applications where tolerances permit. A friction fit plug may be adequate. It may be possible to fix the location of the plug by bonding it with a structural adhesive.

The best mode for the optical module is depicted in FIGS. 2 and 6. It has the fewest number of bonded surfaces. It is the easiest to manufacture. It has only one diaphragm which means that only one element is stressed. In the embodiment of FIG. 2, the base of the cup must be machined to be a thin diaphragm or in the alternative, drilled through and having a diaphragm affixed thereto.

In the case of FIG. 6, the frame 75 cylinder is bored to create an aperture to a depth of a predetermined depth to form a base having a predetermined thickness. A second coaxially located hole is formed in the base having a diameter sufficient to receive the shaft portion of a plug 123.

A collimator subassembly is aligned and centrally bonded to the diaphragm 58 with piezos 70, 72 to form a collimator and diaphragm subassembly.

The collimator and diaphragm subassembly is then bonded to the rim of frame 75.

The shaft of the plug 123 is inserted into the second co-axially located hole in the frame 75.

The plug 123 is moved in a plane transverse to the optical axis while at the same time the collimator subassembly in the plug is moved axially along the optical axis until the interferometer is aligned as indicated by obtaining a peak in output power. Throughout this operation, a signal of predetermined wavelength is injected into the input fiber and the interferometer output power is monitored with a optical power meter at the output fiber output end.

FIG. 4 shows a two diaphragms and two cylinder arrangement. The diaphragm on the left is pre-loaded by the screw as the screw is adjusted to advance axially to deflect the second diaphragm and move the left mirrored lens surface close to the right mirrored surface. The arrangement of FIG. 4 requires more parts than is required for the arrangement of FIG. 2. Two diaphragms and more bonded joints are required.

FIG. 5 depicts the least desirable arrangement of the three. As the first diaphragm is preloaded, the second diaphragm is also preloaded. The dual piezos are mounted on the first diaphragm. A dither voltage is applied to the piezos at several kilohertz. The second diaphragm on the right has to follow the dither all of the time. Therefore, the system has to drive two diaphragms instead of only one.

FIG. 6 is a schematic partial section of a preferred embodiment and best mode alternative structure for the Optical Module of FIG. 2 using a single diaphragm 56 coupled to the frame 75. The diaphragm 56 is made of the same material as the frame 75 which is selected to have a coefficient of thermal expansion selected to be as close as possible to that of the lenses 58, 62. Titanium (Ti) was determined to be acceptable in one arrangement. A plug 123 is shown coupled to the frame 75. The plug 123 provides the same function as the gap adjusting screw 120; however, the plug 123 in the embodiment of FIG. 6 is not threaded, nor is the receiving aperture 122. The plug 123 is fixed or coupled to the frame 75 using an adhesive or glue, screws, clamps or other common clamping means between the plug flange 81 and the left surface 83 of frame 75. Glue is the preferred method.

The first and second collimating lenses are inserted into respective sleeves 125, 127 and bonded. Fibers 22 and 38 are shown inserted into ferrules 129, 131 end-stripped, bonded into the ferrule, polished, and AR (antireflective) coated. The ferrule is shown inserted into a respective sleeve. In this embodiment, the fibers are held in ferrules so that they may be aligned by inserting a ferrule into a sleeve and adjusting the position of the ferrule until the end of the fiber is positioned to maximize the collimation of light exiting the respective collimating lens 58, 62. Mounting the input and output fibers in ferrules makes it possible to more easily handle the fibers when adjusting their longitudinal position in a respective sleeve.

FIGS. 7a through 7c shows a series of pairs of steps in forming the combination of an input or output fiber 22, 38, with a respective first and second sleeve 125, 127 and a respective first and second lens 58, 62 to make a respective first and second collimator subassembly 162, 164. The steps in the method of making a first collimator 162 or second collimator 164 proceed with the steps of:

FIG. 7a shows the first step of inserting and bonding the non-mirrored surface 76, 80 of the first lens 58 and the second lens 62 into the first end 166, 168 of a respective sleeve 125, 127.

FIG. 7b shows the second step of inserting and bonding an input fiber 22 and an output fiber 38 into a respective ferrule 129, 131, end-stripping and polishing each respective fiber to be flush with the end of its respective ferrule to provide a ferrule polished end 183, 185, and coating the ferrule polished ends with an AR (antireflective) coating.

FIG. 7c shows the third step of inserting a respective AR coated ferrule polished end 183, 185 into the second end 187, 181 of a respective sleeve 125, 127.

The fourth and fifth steps in the process are performed by first adjusting the gap between the AR coated ferrule polished end and the non-mirrored surface of the respective lens by inserting a light beam into the respective fiber and adjusting the position of the ferrule in the respective sleeve to obtain maximum collimation of the optical beam by monitoring the output beam using a beam profiler such as the Beam Master manufactured by the Coherent Inc. company of Auburn, Calif. 95602. And second, by bonding the respective ferrule to the respective sleeve thereby forming the first collimator assembly 162 and the second collimator subassembly 164. In an alternative to the foregoing method, the sequence of the first step and the second step may be reversed or practiced concurrently.

The method of making a tunable optical filter is further explained with reference to FIG. 6 and FIG. 7. The right butt end 168 of sleeve 127 on second collimator 164 is concentrically aligned with the center of the left surface of the diaphragm 56 and bonded to the left surface. The outer rim of diaphragm 56 is then bonded to the frame right rim 73 using glue, screws, clamps or other common fastening means. The sleeve 125 of first collimator 162 is then inserted into the receiving hole 122 in plug 123 but not glued.

The plug is inserted into and axially positioned in the receiving aperture 77 in the frame 75. The plug diameter is smaller than the receiving aperture to permit transverse motion of the plug. The first and second mirrored surfaces are thereafter positioned in opposing relation at an adjustable gap distance from each other.

Plug 123 is then inserted into receiving aperture 77 in the frame 75. The plug diameter 79 is smaller than the receiving aperture 77 to permit transverse motion of the plug with the surface of flange 81 in contact with the frame left surface 83. The first collimator 162 is longitudinally positioned the hole in the plug 123 so as to insure that the sleeve 125 can be axially moved in the plug hole 122 through a sufficient axial range (right and left) to achieve a proper gap 65 as the plug 123 is translated in a radial or transverse direction to the optical axis to bring the first and second mirrored surfaces 60, 64 into opposing relation to form gap 65 tuned for a predetermined wavelength.

An optical signal 19 with a predetermined center frequency or wavelength from an optical source 206 is applied to input fiber 22. An optical power meter is used to monitor the optical power out of the output fiber 38. The sleeve 125 is adjusted longitudinally to obtain a peak power output out of the output fiber 38 thereby establishing the required tuned gap 65. The lateral or transverse position of the plug 123 with flange 81 while in contact with the left surface of frame 75 is adjusted to obtain a peak power output out of output fiber 38. The longitudinal and lateral adjustments can be performed simultaneously to find the best axial alignment for reflective surfaces 60 and 64 as indicated by obtaining a peak in output optical power by monitoring optical power meter 204, after which the plug 123 is glued to the frame left surface 83 and the first collimator 162 is bonded into the plug hole 122.

The sleeves 123 are made of glass, ceramic or titanium with titanium being preferred so as to have coefficient of thermal expansion common or close to that of the frame and the lenses. The material chosen should be selected to obtain the best match of thermal coefficient of expansions for best stability. The first and second collimating lenses have a common part number and all sleeves have a common part number.

TEMPERATURE SENSITIVITY

The invention tunable optical filter system can have reduced sensitivity to temperature change. As discussed earlier, the filter's bandpass changes will change with any movement or change in the gap between the two high reflecting surfaces. An increase in temperature increases the length of the collimating lenses which reduces the gap between the reflecting surfaces. However, as the housing or frame 75 is heated, the distance between the two plates to which collimating lenses are attached increases the gap between the reflecting surfaces.

These two effects can be made to cancel each other out. The cancellation is complete if the housing material has the same temperature coefficient of expansion as the lens material, and the distance between the two plates holding the collimating lenses is substantially equivalent to the sum of the lengths of the two lenses. For example, the length of a selfoc lens suitable for use in the present invention is typically 0.5 centimeters and the nominal gap between the reflecting surfaces is of the order of several tens of micrometers. As shown by the following algorithm, this results in a net zero change in the two reflecting surfaces gap, thus making the bandpass wavelength independent of temperature. The decrease in gap, as a result of increasing the temperature of the lenses, with a temperature increase of $\Delta T$, is equal to $2\alpha_1 l(\Delta T)$ where l is the lens length (assumed to be equal for both) and $\alpha_1$ is the lens temperature coefficient of expansion. At the same time, the increase in gap as a result of the increase in the portion of housing length between the diaphragm and the housing end is equal to $\alpha_2 H(\Delta T)$ where H is the portion of housing length 200 bracketing the length of the lenses or the sleeves containing the lenses and $\alpha_2$ is the housing temperature coefficient of expansion. As described above, the gap between the two reflecting surfaces is negligible compared to H. Thus, the net change in the reflecting surfaces gap G is equal to the difference between the term expanding the gap $\alpha_2 H(\Delta T)$ and the term that is shrinking the gap $2\alpha_1 l(\Delta T)$. Therefore, the net change in the gap is equal to $\Delta G = \alpha_2 H(\Delta T) - 2\alpha_1 l(\Delta T)$ and where $L=2l$ $\Delta G = \alpha_2 2l(\Delta T) - 2\alpha_1 l(\Delta T)$ which simplifies to $\Delta G = (\alpha_2 - \alpha_1) 2l(\Delta T)$ and if $\alpha_2 = \alpha_1$, $(\alpha_2 - \alpha_1) = 0$ and $\Delta G = (\alpha_2 - \alpha_1) 2l(\Delta T) = 0$ This shows that if $\alpha_1 = \alpha_2$ then the change in the interferometer gap, and hence the shift in the filter's bandpass with temperature is zero which results in a self-compensating device.

While the invention has been explained in connection with several embodiments, it is intended that only the appended claims be used to limit the scope of this patent. While exemplary embodiments have been described in detail in this specification and in the drawings, it will be appreciated that a number of modifications and variations may suggest themselves to those skilled in the pertinent arts. Such variations and modifications are therefore considered to be the equivalents of the corresponding structures or process steps explicitly described herein, and therefore are believed to be within the scope of the invention as defined in the claims that follow.

What is claimed is:

1. A tunable optical filter system comprising:
   an optical module having,
   a frame,
   a first collimating lens responsive to an optical signal having at least two predetermined wavelengths, the first collimating lens having a first mirror surface and a second collimating lens having a second mirror surface, the first and second collimating lenses being co-axially aligned, the first and second mirrors being partially transparent and positioned in opposed relation forming a tunable optical cavity, the optical module being responsive to a pathlength control signal for selecting and outputting a predetermined wavelength signal selected from the optical signal having at least two predetermined wavelengths,
   a diaphragm coupled to the frame, the diaphragm having at least a first piezo element mechanically attached to the diaphragm to warp the diaphragm in response to the pathlength control signal,
   the second collimating lens being mechanically coupled to the diaphragm and axially positioned by the diaphragm to adjust the gap distance to select a predetermined wavelength signal from the collimated beam and to output the predetermined wavelength signal from an output surface,
   a coupler having an input port coupled to receive the predetermined wavelength signal, a sample port for providing a sample portion predetermined wavelength signal, and an output port for providing an output predetermined wavelength signal, and
   a servo controller responsive to a wavelength select signal to adjust the pathlength control signal to select the predetermined wavelength signal from the optical signal, the servo controller also being responsive to the sample portion of the output predetermined wavelength signal to finely adjust the pathlength control signal to maximize the optical power of the sample portion of the selected predetermined wavelength signal.

2. The tunable optical filter system of claim 1 wherein:

the first collimating lens has an input surface coupled to receive the light beam, to collimate the light beam and to output a collimated beam into the cavity.

3. The tunable optical filter system of claim 2 wherein the first collimating lens and the second collimating lens are each contained in respective sleeves formed from material having a temperature coefficient that is substantially the same as that of the lens material and wherein the optical module further comprises:

an input fiber responsive to and carrying the optical signal, the input fiber having an output end coated with a non-reflective coating, the input fiber output end being coupled to the first collimating lens input surface to couple the optical signal into the first collimating lens.

4. The tunable optical filter system of claim 2 wherein the frame further comprises:

a cylindrical housing having an aperture at a first end and a diaphragm coupled to the frame at the second end, the diaphragm having an inner piezo and an outer piezo, the inner piezo and the outer piezo being electrically coupled to the pathlength control signal to expand and contract in opposing relationship to warp the diaphragm to move the second collimating lens in a first coaxial direction in response to a pathlength control polarity signal having a first polarity and in an opposite direction in response to a pathlength control polarity signal having an alternate polarity, the aperture being sealed by a cap having an aperture, the input fiber passing through the aperture, the input fiber output end being coupled to the first collimating lens input surface to couple the light beam into the first collimating lens.

5. The tunable optical filter system of claim 2 wherein the optical module further comprises:

an output fiber, the output fiber passing through an aperture in the diaphragm and having an input end coupled to the second collimated lens output surface to receive and carry the predetermined wavelength signal from the second collimated lens output surface to the input of a coupler, the coupler having an output end for outputting most of the predetermined wavelength signal and a sample end for outputting the sample portion of the output determined wavelength signal.

6. The tunable optical filter system of claim 2 wherein the frame further comprises:

a first cylindrical cup having a rim around an aperture at a first end and a thin base forming a first diaphragm, the first diaphragm having an inner surface at the interior base of the cup and an outer surface, the first diaphragm having a small centered aperture, a second cylindrical cup having a rim around an aperture at a first end and a base having a threaded aperture, a cylindrical plug having a threaded portion for insertion in and engagement with the second cylindrical base threaded aperture, the cylindrical plug having a centered aperture, a second diaphragm having a first face and a second face, the second diaphragm being rigidly positioned between the first cylindrical cup rim and the second cylindrical cup rim with the first face facing into the first cylindrical cup aperture, the second diaphragm having a center aperture, an input fiber passing through the cylindrical plug center aperture and through the second diaphragm center aperture carrying the optical signal from a light source, the optical signal having at least a first and a second wavelength from which a predetermined wavelength is to be selected, the first collimating lens input surface being coupled to the second diaphragm first face, the input fiber having an output end coupled to the first collimating lens input surface to couple the light beam into the first collimating lens, the second collimating lens output surface being coupled to the first diaphragm inner surface, means for coupling the plug to the second diaphragm second surface, the plug being rotated advance and axially position the first collimating lens mirror surface to a predetermined gap distance from the second collimating lens mirror surface, the coupler having an input port coupled to the first collimating lens output surface to receive the predetermined wavelength portion of the collimated output beam and to provide a sample portion of the predetermined wavelength portion of the collimated output beam via a sample output port, the servo controller responsive to a wavelength select signal characterized to identify the predetermined wavelength to be selected, and to provide a coarse pathlength control signal to the piezo elements to adjust the gap distance to coarse select the predetermined wavelength portion of the collimated output beam, the servo controller also being responsive to the sample portion of the predetermined wavelength portion of the collimated output beam to adjust the pathlength control signal to the piezo elements to maximize the optical power of the predetermined wavelength portion of the collimated output beam.

7. The tunable optical filter system of claim 2 wherein the frame further comprises:

a first cylindrical cup having a rim around an aperture at a first end and an integral base, the base having a threaded aperture, a cylindrical plug having a threaded portion for insertion in and threaded engagement with the first cylindrical cup threaded aperture, the cylindrical plug having a central aperture, a second cylindrical cup having a rim around an aperture at a first end and a base having an aperture at a second end, a first diaphragm having a first and second surface and a centered aperture, the first diaphragm being positioned and rigidly held between the first cylindrical cup rim and the second cylindrical cup rim, the first surface facing into the second cylindrical cup, the first collimating lens input face being coupled to the base of the second cup, an input fiber having an output end coupled to the first collimating lens input surface via the second cup base aperture to couple the light beam into the first collimating lens, the second collimating lens output face being coupled to the first diaphragm first face, an output fiber having an input end coupled to the second collimating lens output face to receive the selected predetermined wavelength, the output fiber carrying the selected predetermined wavelength via the first diaphragm aperture to the cylindrical plug central aperture, the first cup base with threaded cylindrical plug therein forming a second diaphragm, means for coupling the threaded cylindrical plug to the first diaphragm second surface, the plug being rotated to axially position the second collimating lens mirror surface to a predetermined gap distance from the first collimating lens mirror surface, the servo controller being responsive to a wavelength select signal characterized to identify the predetermined wavelength to be selected and to an acquire and track logic signal first state to output a pathlength control signal to the piezo elements to adjust the gap distance to coarse select the predetermined wavelength portion of the collimated output beam, the servo controller also being responsive to the sample portion of the predetermined wavelength signal and to an acquire and track logic signal second state to activate a lock-in amplifier to adjust the pathlength control signal to the piezo elements to maximize the optical power of the sample portion of the predetermined wavelength signal.

8. The tunable optical filter of claim 2 wherein the frame further comprises means for initially adjusting the length of the cavity to one half of an integer number of first predetermined wavelengths.

9. The tunable optical filter of claim 2 wherein the frame further comprises:

means for initially adjusting the gap distance of the cavity to one half of an integer number of first predetermined wavelengths, and wherein the first predetermined wavelengths is selected to be the predetermined wavelength that is centrally positioned in the spectrum of all predetermined wavelengths.

10. The tunable optical filter of claim 9 wherein the means for adjusting the gap distance of the cavity to be one half of an integer number of first predetermined wavelengths further comprises:

at least a first threaded member coupled to the frame and in contact with the diaphragm, the threaded member being rotated to initially adjust the position of the diaphragm to an initial position characterized to maximize the output signal for the first predetermined wavelength.

11. The tunable optical filter of claim 2 wherein the frame has a first portion extending from the first diaphragm to a first point of support, the first and second collimating lenses being coaxially positioned between the diaphragm and the first point of support, and wherein the first collimating lens and second collimating lens having a combined length plus the gap distance L substantially equal to the length of the frame first portion, the first and second collimating lenses being formed from a first material having a first coefficient thermal expansion, and wherein the frame first portion is formed from a second material having a second coefficient of thermal expansion, and wherein the first and second materials are selected to have thermal coefficients of expansion that are substantially equal thereby making the optical filter substantially self temperature compensating.

12. The tunable optical filter system of claim 1 wherein the second collimated lens has an output surface; and, an output fiber having an input end coupled to the second collimated lens output surface to receive and carry the predetermined wavelength signal from the second collimated lens output surface to the input port of the coupler, to select the predetermined wavelength signal from the collimated beam and to output the predetermined wavelength signal from an output surface of the coupler, the output port outputting most of the predetermined wavelength signal wavelength signal.

13. The tunable optical filter system of claim 1 further comprising a DAC (digital-to-analog converter) wherein the DAC is characterized to be responsive to a digital input data word characterizing the value of the predetermined wavelength selection signal and converting the digital input into an analog output signal for the wavelength select signal.

14. The tunable optical filter system of claim 13 wherein the DAC is further characterized to be responsive to a calibrate logic signal having a first and second state, the first state being characterized to substitute an externally derived calibrate signal for the wavelength select signal input to the servo controller.

15. The tunable optical filter system of claim 1 wherein the optical module further comprises:

a cylindrical housing having a rim around an aperture at a first end, a diaphragm at a second end, the diaphragm having an inner piezo and an outer piezo, the inner piezo and the outer piezo being electrically coupled to the pathlength control signal to expand and contract in opposing relationship to warp the diaphragm to move the second collimating lens in a first coaxial direction in response to a pathlength control signal having a first polarity and to move the second collimating lens in an opposite direction in response to a pathlength control signal having a second polarity.

16. The tunable optical filter system of claim 1 wherein the servo controller further comprises:

an adaptive circuit responsive to an acquire and track logic signal having a first and second state, the adaptive circuit responding to first state by configuring to a coarse wavelength selection mode circuit configuration and to a second state by configuring to a fine wavelength selection mode circuit configuration, the coarse wavelength selection mode circuit configuration being responsive to an acquire and track logic signal first state and a wavelength select signal for adjusting the gap distance to a dimension characterized to enable the servo controller to output a pathlength control signal having an amplitude and polarity characterized to adjust the tunable cavity to select the predetermined wavelength and to initialize an integrator circuit, the servo controller being disconnected from the wavelength select signal in response to a an acquire and track logic signal second state, coupled to monitor the optical power of a portion of the predetermined wavelength signal, and configured to operate as a slope chasing servo (a lock-in amplifier) by adjusting and dithering the pathlength control signal while synchronously detecting and integrating the sample portion of the predetermined wavelength signal to adjust the pathlength control signal to maximize the optical power of the sample portion of the predetermined wavelength signal.

17. The tunable optical filter of claim 1 further comprising:

means for adjusting the gap distance of the cavity to be one half of an integer number of first predetermined wavelengths is further characterized to set the cavity to have a gap distance L characterized by the following equation:

$$L = \frac{m\lambda}{2}$$

where m is an integer and λ is the center wavelength of the light passing trough the tunable optical filter.

18. A tunable optical filter system comprising:
an optical module having, a tunable optical cavity, the optical module being responsive to a pathlength control signal for selecting and outputting a predetermined wavelength signal selected from a optical signal having at least two wavelengths,
a servo controller responsive to an input signal characterized to adjust the pathlength control signal to select the predetermined wavelength signal, the servo controller also being responsive to a sample portion of the output predetermined wavelength signal to finely adjust the pathlength control signal to maximize the optical power of the sample portion of the output predetermined wavelength signal,
a frame,
a first collimating lens and a second collimating lens, each collimating lens having a mirrored surface, the mirrored surfaces being co-axially aligned and normal to a common optical axis and separated by a gap distance to form an optical cavity therebetween,
the first collimating lens having an input surface coupled to receive the optical signal having at least two wavelengths, collimating the light beam and outputting a collimated beam into the cavity,
a diaphragm coupled to the frame, the diaphragm having at least a pair of piezo elements mechanically attached to the diaphragm to warp the diaphragm in response to the pathlength control signal,
the second collimating lens being mechanically coupled to the diaphragm and axially positioned by the diaphragm to adjust the gap distance to select a predetermined wavelength signal from the collimated beam and to output the predetermined wavelength signal from an output surface.

19. A tunable optical filter system comprising:
an optical module having, a frame,
an input fiber carrying a optical signal from a light source, the optical signal having at least a first and a second wavelength from which a predetermined wavelength is to be selected,
a first and a second axially aligned collimating lens, each collimating lens having a mirrored surface normal to the optical axis, separated by a gap distance to form a cavity,
the input fiber coupling the light beam into the first collimating lens, the first collimating lens collimating the light beam and outputting a collimated output beam via its mirrored output surface into the cavity,
a diaphragm coupled to the frame, the diaphragm having at least a pair of piezo elements mechanically attached to the diaphragm,
the second collimating lens being mechanically coupled to and positioned by the diaphragm to adjust the gap distance to select a predetermined wavelength signal from the collimated output beam and to output the predetermined wavelength signal from an output surface,
a coupler having an input port coupled to receive the predetermined wavelength signal and to provide a sample portion of the predetermined wavelength signal to a sample output port,
a servo controller responsive to a wavelength select signal characterized to identify the predetermined wavelength signal to be selected and for providing a coarse pathlength control signal to the piezo elements to coarse select the predetermined wavelength signal portion of the collimated output beam and responsive to the sample portion of the predetermined wavelength signal to adjust the pathlength control signal to the piezo elements to maximize the optical power of the predetermined wavelength portion of the collimated output beam.

20. A method of making a tunable optical filter comprising the steps of:
providing a first and second collimator 162, 164 subassembly,
the tunable optical filter being fabricated using the first collimator 162 and the second collimator 164 using the following steps:
concentrically aligning and bonding the second end of sleeve 127 on the second collimator 164, to the left surface of a diaphragm 56 and concentrically aligning and bonding a left rim of the diaphragm 56 to a right rim of frame 75,
inserting the first collimator 162 into the center hole in the plug,
inserting the plug into an axially positioned receiving aperture 77 in the frame 75, the plug diameter being smaller than the receiving aperture to permit transverse motion of the plug, the first and second mirrored surfaces being in opposing relation at an adjustable gap distance from each other,
while delivering a predetermined optical signal having a predetermined wavelength to the input fiber, adjusting the transverse position of the plug and the axial position of the first collimator 162 in the plug 123 to obtain maximum optical power output from the output fiber,
bonding the plug to the frame and the collimator to the plug at the position determined to produce maximum optical power output.

21. The tunable optical filter of claim 20 wherein the step of making the first and second collimator further comprises the steps of:
inserting and bonding the non-mirrored surface of at least a first lens having a first mirrored surface and second lens having a second mirrored surface into the first end of a respective sleeve 125, 127,
inserting and bonding an input fiber and an output fiber into a respective ferrule 129, 131, and end-stripping and polishing each respective fiber to be flush with the end of its respective ferrule to provide a ferrule polished end, and coating the ferrule polished end with an AR (antireflective coating),
inserting a respective AR coated ferrule polished end into the second end of a respective sleeve,
adjusting the gap between the AR coated ferrule polished end and the non-mirrored surface of the respective lens by inserting a light beam into the respective fiber and adjusting the position of the ferrule in the respective sleeve to obtain maximum collimation of the optical beam,
bonding the respective ferrule to the respective sleeve thereby forming the first or second collimator subassembly.

22. The tunable optical filter of claim 21 wherein the step of making the first and second collimator further comprises the steps of:

inserting and bonding an input fiber and an output fiber into a respective ferrule 129, 131, and end-stripping and polishing each respective fiber to be flush with the end of its respective ferrule to provide a ferrule polished end, and coating the ferrule polished end with an AR (antireflective coating), inserting and bonding the non-mirrored surface of at least a first lens having a first mirrored surface and second lens having a second mirrored surface into the first end of a respective sleeve 125, 127, inserting a respective AR coated ferrule polished end into the second end of a respective sleeve, adjusting the gap between the AR coated ferrule polished end and the non-mirrored surface of the respective lens by inserting a light beam into the respective fiber and adjusting the position of the ferrule in the respective sleeve to obtain maximum collimation of the optical beam, bonding the respective ferrule to the respective sleeve thereby forming the first or second collimator subassembly.

* * * * *